July 16, 1929.  R. H. SILVESTER ET AL  1,720,764
SHOE STIFFENER
Filed March 16, 1927

INVENTORS
Robert H. Silvester
William H. Bancroft
By their Attorney
Nelson M. Howard Patented July 16, 1929.

1,720,764

UNITED STATES PATENT OFFICE.

ROBERT HENRY SILVESTER AND WILLIAM HAROLD BANCROFT, OF LEICESTER, ENGLAND, ASSIGNORS TO UNITED SHOE MACHINERY CORPORATION, OF PATERSON, NEW JERSEY, A CORPORATION OF NEW JERSEY.

SHOE STIFFENER.

Application filed March 16, 1927, Serial No. 175,879, and in Great Britain March 22, 1926.

This invention relates to a stiffener for use in the manufacture of boots and shoes and to a method of making the stiffener, and is herein illustrated in its application to the stiffening of the toe portions of the uppers of boots and shoes although not limited in its application to that particular portion of the shoe.

A type of toe stiffener commonly used comprises a fibrous base impregnated with a thermoplastic substance, that is, a substance which is normally hard but may be rendered soft and plastic by heat. Such a stiffener is incorporated in the upper of a shoe, heated either before or after incorporation to render it soft and plastic, given its desired shape while hot when the upper is conformed to the last, and then permitted to cool and thereby harden. Although box toes of this type have been extremely successful and have gone into wide commercial use, they nevertheless have certain disadvantages. The thermoplastic substances which are commercially available, such as mixtures of blown asphalt and colophony, have a tendency to become brittle and to crumble during the wearing of the shoe, the resilience of such mixtures being also of a comparatively low degree and somewhat short-lived so that when the toe portion of the shoe, containing such a thermoplastic stiffener, is deformed by pressure it does not fully resume its shape after the pressure is removed. Again, the toe portion of the finished shoe, when exposed to solar heat, for example when the shoe is displayed in a shop window in a warm climate, tends to sag and become permanently deformed due to softening of the thermoplastic substance. Again, thermoplastic stiffeners have in general proved unsuitable for use in so-called "plain-toed" shoes, that is shoes which have no toe cap, since they are in general too stiff and the rear edges of the stiffeners, being necessarily quite stiff, tend to show through the uppers in which they are incorporated.

In one aspect the present invention relates to a stiffener comprising a plurality of layers of fibrous material impregnated with a thermoplastic substance and bonded together with a resilient substance which does not soften at temperatures which are sufficient to soften the thermoplastic substance. In the illustrated stiffener the two layers of fabric are bonded together by rubber which adds toughness and resilience to the stiffener and resists deformation by solar heat. Moreover, a stiffener of this kind may be prepared which has the qualities of flexibility and resilience which are particularly desirable in plain-toed shoes.

In another aspect the invention provides a method of making a stiffener which comprises bonding together a plurality of layers of fibrous material with a resilient substance and impregnating them with a thermoplastic substance. In the illustrated method, sheets of fabric are bonded together with rubber, and the product impregnated with a thermoplastic substance; and subsequently the stiffeners are cut out of the laminated sheet. The impregnation may be carried out, for example, by immersing the rubber bonded sheets in molten thermoplastic substance or in a solution of such substance, the impregnated sheet material being allowed to cool or to stand until the solvent has evaporated before the stiffeners are cut out of it.

Referring now to the accompanying drawings.

Figure 1:
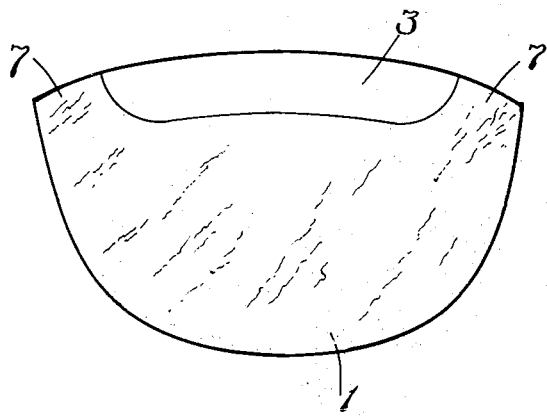
Figure 1 is a plan of a stiffener according to the present invention.
Figure 2:
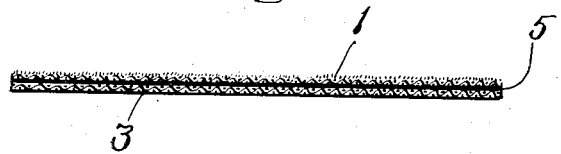
Figure 2 is a cross-section through a portion of the laminated sheet material from which it was cut out.

The illustrated stiffener is particularly adapted for use in plain-toed shoes. The laminated sheet material shown in Figure 2 consists of a sheet of cotton flannel 1, bonded to a sheet of cotton 3 by rubber 5. This stock may be made in various ways. For example, a thin coating of unvulcanized rubber may be applied to one sheet of fabric, the other sheet superposed upon the coating, and the layers firmly pressed together, after which, if desired, the rubber may be vulcanized. Or, the two sheets may be bonded by rubber cement. Preferably one of the sheets—that of cotton flannel in the illustrated stock—is raised considerably on one side so that it has a well defined nap, while the other sheet is very thin, closely woven, plain material with only a slight nap on one side; and the sheets are so put together that in the finished stock only the nap of the cotton flannel is exposed. The stock, thus produced, is impregnated with a thermoplastic substance, for example by being immersed in a molten mixture consisting of 75% of colophony and 25% of blown asphalt; and, after the substance has cooled and hardened, the stiffeners are cut out of the composite, laminated sheet, the rear margin of each stiffener is then skived, as shown in Figure 1, by cutting away partly or wholly the rear margin of the layer 1 so as to leave the then projecting margin of the layer 3 uncut, the thin margin of the layer 3 then forming all or nearly all of the rear margin of the stiffener. In the illustrated stiffener, the cutting has been so carried out that the ends 7 of the rear margin of the layer 1 have been left uncut. The purpose of this is to provide stout portions at the ends since these portions are grasped by the pincers of the pulling-over machine. If it is desired to render the rear margin of the stiffener still more flexible, the thermoplastic substance may be expressed wholly or in part from the margin of the layer 3 by means of heat and pressure after the manner described in application Serial No. 759,084, filed December 31, 1924, in the names of Bancroft, Lund and Hill.

The finished stiffener, owing to the presence of the rubber, has a remarkable degree of toughness and resilience and retains these qualities. The rubber is present in sufficient quantity to impart these qualities as well as to resist objectionable softening of the stiffener from the effect of solar heat but in a quantity insufficient to interfere with the thermoplastic quality of the stiffener. The stiffener may therefore be incorporated in a shoe, heated and conformed to the last after the manner of thermoplastic stiffeners as heretofore provided.

Although the invention has been set forth as embodied in a particular stiffener and a particular method of manufacture, it should be understood that the invention is not limited in the scope of its application to the particular stiffener nor to the particular method which have been described.

The term "rubber" as used in the appended claims is intended to cover rubber, balata, gutta-percha and similar substances.

Having thus described our invention, what we claim as new and desire to secure by Letters Patent of the United States is:

1. A thermoplastic shoe stiffener comprising layers of fibrous material impregnated with a thermoplastic substance which is normally hard and resilient and bonded together with a resilient substance capable of resisting softening at a temperaure sufficient to soften the thermoplastic substance.

2. A stiffener for boots and shoes comprising a plurality of layers of fibrous material cemented together with rubber, said layers being impregnated with a thermoplastic substance which is normally hard and resilient.

3. A stiffener for boots and shoes comprising a plurality of layers of fibrous material cemented together with rubber, one of said layers having a nap and being impregnated with a thermoplastic substance which is normally hard and resilient.

4. A stiffener for boots and shoes comprising a plurality of layers of fibrous material cemented together with vulcanized rubber, one of said layers being impregnated with a thermoplastic substance which is normally hard and resilient.

5. A stiffener for boots and shoes comprising a layer of fabric having a considerable nap and another layer of fabric substantially without a nap, said layers being bonded together with rubber and being impregnated with a thermoplastic substance which is normally hard and resilient.

6. A stiffener for boots and shoes comprising a plurality of layers of fibrous material bonded together by rubber and impregnated with a thermoplastic substance which is normally hard and resilient, one layer being of greater extent than another so that its rear margin projects beyond the rear edge of the other layer.

7. A stiffener for boots and shoes comprising a plurality of layers of fibrous material bonded together by rubber and impregnated with a thermoplastic substance which is normally hard and resilient, one layer being of greater extent than another so that its rear margin projects beyond the rear edge of the other layer, said rear margin being substantially free from thermoplastic substance.

8. The method of making a stiffener for boots and shoes which comprises bonding together a plurality of layers of fibrous material with rubber, impregnating the layers with a thermoplastic substance which is normally hard and resilient and cutting out stiffeners from the laminated sheet.

9. The method of making a stiffener for boots and shoes which comprises bonding together a plurality of layers of fibrous material with rubber, vulcanizing the rubber, impregnating the layers with a thermoplastic substance which is normally hard and resilient and cutting out stiffeners from the laminated sheet.

In testimony whereof we have signed our names to this specification.

ROBERT HENRY SILVESTER.
WILLIAM HAROLD BANCROFT.